E. L. CLARK.
HEADLIGHT.
APPLICATION FILED JUNE 11, 1915.
1,345,073.
Patented June 29, 1920.
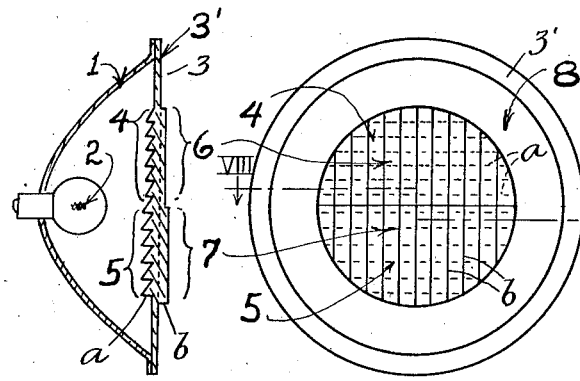
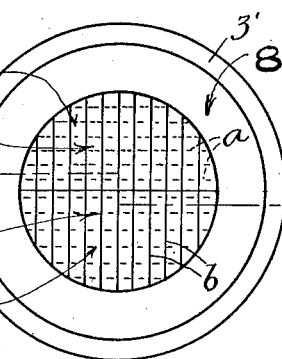
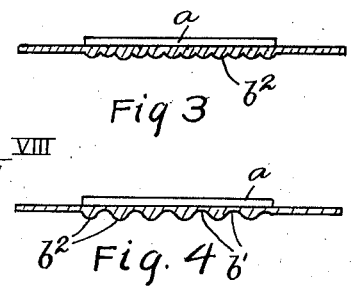
Fig. 1  Fig. 2
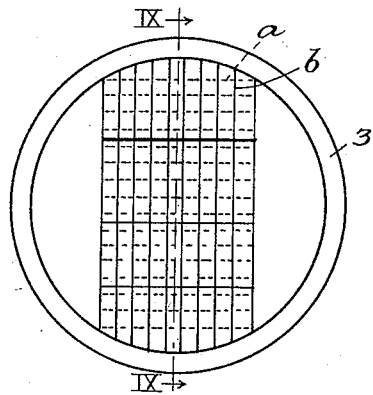
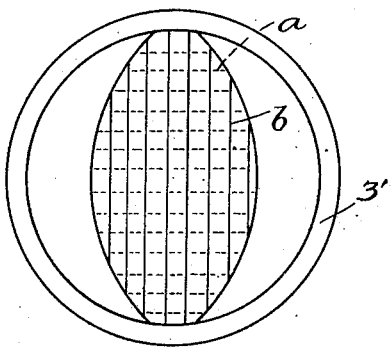
Fig. 6  Fig. 7
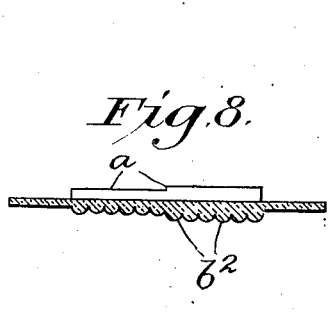
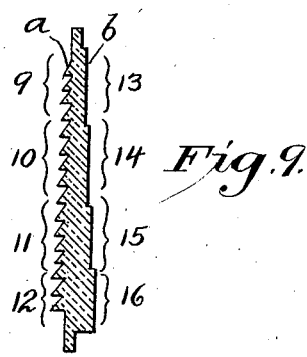
WITNESSES:
Irene Majerus.
Mae M. Clark
INVENTOR
Emerson L. Clark

UNITED STATES PATENT OFFICE.

EMERSON L CLARK, OF LAKEWOOD, OHIO.

HEADLIGHT.

1,345,073.   Specification of Letters Patent.   Patented June 29, 1920.

Application filed June 11, 1915. Serial No. 33,457.

*To all whom it may concern:*

Be it known that I, EMERSON L. CLARK, a citizen of the United States, residing at Lakewood, in the county of Cuyahoga and State of Ohio, have invented a certain new and useful Improvement in Headlights, of which the following is a full, clear, and exact description.

The object of my invention is to provide an improved headlight for vehicles, particularly automobiles, that will improve the distribution of the projected light.

The present common form of automobile headlight, having a paraboloidal reflecting surface with a source of light situated nearly or substantially at its focus and provided with a plain glass front, screen or so-called "lens", projects a beam of light that is approximately symmetrical about the axis of the reflector and of nearly-parallel-rayed, (*i. e.* but slightly conical) form with the maximum intensity near the center of the beam. In order to light the roadway well at a sufficient distance from the car for safe driving, with such an unmodified distribution, it is necessary to set the lamp nearly horizontal so that the center of the beam, or beam area of maximum intensity, is horizontal or a trifle below horizontal. This, because the intensity of the illumination produced, diminishes with the square of the distance of the surface lighted from the lamp, from which it follows that the light directed toward the most distant part of the road that it is desired to illuminate should be the most intense. With such a lamp-setting the uppermost part of the conical beam, of less intensity than the area thereof near the center, is not effective in illuminating the roadway, but is practically wasted from the viewpoint of illumination and is positively harmful from the viewpoint of safety since the glaring of the part of the beam high above the road is blinding to the eyes of approaching drivers and pedestrians.

More specifically, it is the object of my present invention to overcome this defect and danger of glaring, and further to make effective, for improving the illumination of the roadway, the light that heretofore has been harmful and wasted.

For best securing the desired results, I produce a beam having its maximum intensity near its top rather than near its center, and having appropriate areas so depressed and spread vertically and so spread laterally that a very useful illumination of the roadway results when the headlight is set so that the maximum intensity of the projected beam is near the horizontal. In the drawing, wherein I have illustrated diagrammatically several forms of glass fronts or screens embodying my invention, Figure 1 is a vertical section through a parabolic reflector associated with a source of light and with a refracting front of glass; Fig. 2 is a front view of the glass shown in Fig. 1; Fig. 3 is a horizontal section through the central portion of the refracting glass, showing convex spreaders; Fig. 4 is a view similar to Fig. 3 showing convex and concave spreaders in combination; Fig. 5 is a similar view showing prismatic spreaders; Fig. 6 is a front view of a modified glass showing a different arrangement of the refracting area; Fig. 7 is a front view showing another modified arrangement of refracting area; Fig. 8 is a horizontal section of Fig. 2 taken on the broken line VIII—VIII thereof; and Fig. 9 is a section taken on the line IX—IX, Fig. 6.

In the drawings, 1 is the reflector of suitable form to concentrate the light rays reflected therefrom, and emanating from a source of light 2, into a nearly parallel-rayed beam, the beam being projected through the glass front or screen 3, which screen, as shown in Fig. 1, may have its marginal positioning border 3' in a substantially vertical plane and bearing against the open mouth of the reflector, to be clamped in any customary fashion. As to the light source, the best results are secured when a gas-filled incandescent electric light bulb of recent development is used, such bulb having a highly concentrated filament. By the use of such a highly concentrated source of light a more concentrated beam may be secured to start with, and such a beam, having initially a minimum of conical spread, is particularly susceptible of efficient control by the screen hereinafter particularly described.

The glass front 3 is of a character suitable to control the light distribution from a concentrated source when such glass is combined, as described, with the paraboloidal or concentrating reflector of well known form. The glass, in the construction shown, has, formed on its surface, downwardly refracting structure as prismatic elements, and laterally refracting structure, as prismatic or cylindrical spreading elements, these structures being in optical superposition to act jointly on a selected portion of the projecting beam and being formed to spread the affected beam-area to the maximum extent desired and thereby to diminish its intensity, by increasing its area, for short-distance lighting; and also the glass has another surface area or areas formed to direct another selected portion of the beam with greater concentration for more distant roadway lighting. The action of each one of the elements that I employ in the glass formation—that is to say, downwardly refracting prismatic elements and laterally spreading prismatic or cylindrical elements is well known in the art; but it is the combination of these parts, as herein set forth, that produces the desired result under the conditions imposed by automobile-headlight construction and use, and which constitutes my invention, specific embodiments of which I am about to describe.

To form the uppermost concentrated part of the beam, in the construction shown in Fig. 1, I provide a clear glass ring 8 around the border of the light-transmitting area of the lamp front, thereby permitting the unmodified passage of the light from the outermost portion of the reflector. This selection of the outer border as the part through which any rays that are to be unmodified shall pass is advantageous because the light from the outer portion of the reflector has less angular spread and therefore is well adapted for illuminating distant roadway surfaces.

The remainder of the glass front, Fig. 1, consists of a series of downwardly refracting elements and laterally spreading elements optically superimposed so as to jointly affect the rays transmitted through these areas, these coacting elements being shown as formed one behind the other. The downwardly refracting elements $a$ (dotted in the several face views) may consist of a series of triangular prisms, extending horizontally or in a generally horizontal direction and molded on the rear face of the glass, their thicker portions being toward the bottom. The laterally spreading elements $b$, illustrated as being molded on the other side of the glass screen, are shown by full vertical lines, Fig. 2, in the form of a series of parallel cylindrical surfaces, running vertically. The laterally spreading elements may consist of both concave and convex elements $b^1$ and $b^2$, respectively, as shown in Fig. 4, forming a corrugated surface, or they may consist of either alone (convex elements $b^2$ being indicated in Fig. 3), or they may be prismatic elements $b^3$ (generally illustrated in Fig. 5), set at a variety of angles so as to give a spread instead of a mere deflection of the beam.

The downward refractors may be divided into a number of areas, preferably horizontal strips, each strip having a different refracting value so as to deflect downwardly by different amounts the portions of the beam traversing the several strips. The laterally spreading refractors opposite each strip are also preferably made with different spreading powers, those of greatest spreading power being placed opposite the deflectors of greatest deflection and so on to the least deflecting, which is opposed by the least spreading refractors. In this way, the light striking the ground nearest the lamp is given the greatest angular spread, with greatest consequent decrease in intensity, the light striking the ground farthest from the lamp is given the least angular spread, or maintained with greatest concentration, for preservation of relatively-great intensity, and the light striking between has a graded spread according to its depression and lateral distributive dispersion. Thus, referring to Fig. 1, the downward refractors $a$ of group 4 are less depressing than those of group 5, and the lateral spreaders $b$ of group 6 are less spreading than those of group 7. The lesser lateral spreaders (group 6) are opposite the lesser downward deflectors (group 4) and spread the light which has been depressed by deflectors of group 4, by virtue of the optical superposition of the two kinds of elements. In a similar way the greater lateral spreaders of group 7 are opposite the downward deflectors of greater power, of group 5, and spread the light depressed by the last-mentioned group. In Figs. 1, 2 and 8 two sets of refracting groups only are shown for the sake of simplicity, the full horizontal line (Fig. 2) marking the zonal division, but a more effective modification of the beam for roadway illumination is secured when a larger number of groups having different depressing and spreading powers are used. While Fig. 1 shows the downwardly spreading refractors on the rear face and the laterally spreading refractors on the front face, this arrangement may be reversed.

As shown in Figs. 6 and 9, the refracting area may extend from top to bottom of the effective surface of the glass (that is to say, the exposed surfaces within the clamping or positioning margin $3^1$), the full horizontal lines marking the boundaries of the refracting areas of different powers, groups 13, 14, 15 and 16 of differently powered lateral spreaders being respectively superimposed optically on groups 9, 10, 11 and 12 of differently-angled depressor-prisms. Also, in Fig. 7, there is shown a glass front having a vertically-extended area of control by refraction, this being of perimetral contour different from the others. It will therefore be apparent that the extent and shape of the area affected by the light controlling refractive elements may be varied as desired.

With a combination of a suitably concentrated light source, placed substantially at the focus of a concentrating reflector, and a redistributing refractive front such as I have described, an efficient and non-glaring beam of light for roadway illumination is produced. Such beam, substantially free of dark spots, is selectively and variantly spread longitudinally and broadened laterally by the spreading effect of the superimposed and coacting downward-spreading and lateral-spreading elements, and its modification from the initially conical form betters the short distance and middle distance illumination without losing its effectiveness for distant-roadway lighting.

I claim:—

1. A refractive screen for use with a headlight having a reflector comprising surfaces of variant vertical distributive dispersion and surfaces of variant lateral distributive dispersion at and beyond the intercept of the roadway.

2. A refractive screen for use with a source of illumination and a reflector associated therewith to project a substantially parallel-rayed beam of reflected light, said screen having optically superimposed surfaces formed to variantly depress and variantly broaden the beam.

3. A refractive screen, for use with a source of illumination and a reflector associated therewith to project a substantially parallel-rayed beam of reflected light, having downwardly-refracting elements of variant refracting power and optically superimposed thereon laterally-refracting elements of variant refracting power.

4. In combination, a concentrating reflector, a refractor located in front of said reflector, said refractor having downwardly refracting elements of varying refracting power on one side and laterally refracting elements of varying refracting power on the other side.

5. In a headlight refractor, a transparent medium having a downwardly refracting surface of varying refracting power on one side and a laterally refracting surface of varying refracting power on the other side.

6. In a headlight refractor, the combination of a plurality of downwardly refracting elements of different refracting power on one side thereof, with a plurality of laterally spreading refracting elements of different spreading power on the other side thereof.

7. In a headlight, the combination of a concentrating reflector with a refracting front having on one side a plurality of transverse prism elements of varying refracting power adapted to deflect the light downwardly and increase its vertical spread, and on the other side a plurality of vertical cylindrical elements adapted to spread the transmitted beam laterally.

8. In a headlight refractor, the combination of a plurality of downwardly refracting elements of varying refracting power on one side thereof, with a plurality of laterally spreading refracting elements of varying spreading power on the other side thereof so disposed that said spreading elements of greatest spreading power are opposite the downwardly refracting elements of greatest deflecting power in the direction of the transmitted light, and the said spreading elements of less refracting power are opposite the said downwardly refracting elements of less downwardly deflecting power in the direction of the transmitted light.

9. A refractive screen for use with an automobile headlight having a concentrated source of light and a reflector for throwing a nearly parallel-rayed beam, comprising surfaces of variant lateral and variant vertical distributive dispersion, arranged for greater spreading of the lower portion of the light for lesser intensity at its closest intercept with the roadway and for greater concentration and intensity of the upper portion for more distant roadway illumination.

10. A headlight refractor, for use in combination with a concentrated source of light and a reflector for projecting a concentrated substantially symmetrical beam of light, having refracting surfaces formed to depress the beam vertically, to broaden it laterally and to spread the light to a greater extent below than above the middle of the beam, thereby to maintain the maximum light-intensity of the emergent beam above the middle of the beam for distance-lighting.

11. The combination with a lamp having a source of light and a reflector adapted to project the light from said source in a nearly-cylindrical beam, of a glass front for the lamp through which substantially the entire projected beam may pass, the glass having one area formed to deflect laterally and refract downwardly a selected portion of the projected beam for short-distance lighting and having another area thereof formed to direct another selected portion of the beam with less vertical deflection and lateral refraction for more distant roadway lighting.

12. A headlight refractor comprising a glass having one portion consisting of a downwardly refracting element and a laterally spreading element, these coacting to jointly affect the rays passing through one area of the glass to depress and to laterally spread the same for illuminating one roadway area, and having another portion structurally differing from that first-mentioned to cause a difference in effect on the rays passing therethrough for illuminating another roadway area, in combination with a concentrated source of light and a concentrating reflector adapted to reflect the rays in nearly-cylindrical beam through said glass.

13. The combination of a lamp having a source of light and a reflector adapted to project the light from said source in a nearly-cylindrical beam, of a glass front for the lamp comprising a body having an area provided with refracting elements of vertical-cylindrical and horizontal prismatic form adapted to spread, both laterally and downwardly a selected portion of the projected beam for shorter-distance lighting and a plain area adapted to direct another selected portion of the beam for more distant lighting.

14. The combination with a suitably concentrated source of illumination and a reflector associated therewith to project a nearly-parallel-rayed beam of light, of a refractive screen filling the opening of said reflector and having thereon, in superimposed relation, a plurality of horizontally extending prismatic depressor elements and a plurality of vertically extending laterally spreading elements coacting to both broaden and depress the beam and to mingle the rays thereof for minimizing sudden variations in intensity of the roadway-illumination.

15. The combination with a suitably concentrated source of illumination and a reflector associated therewith to project a nearly-parallel-rayed beam of light, of a reflective screen filling the opening of said reflector and having thereon, in superimposed relation, a plurality of horizontally extending prismatic depressor elements and a plurality of vertically extending laterally spreading elements coacting to variantly broaden and to depress the beam and to mingle the rays thereof for minimizing sudden variations in intensity of the roadway-illumination.

16. In a headlight refractor, the combination of a plurality of horizontal prisms, with a superimposed refracting surface coacting with said prisms jointly to refract laterally-outwardly and downwardly the light rays that pass through the refractor.

17. The combination with a suitably concentrated source of illumination and a reflector associated therewith to project a nearly-parallel-rayed beam of light, of a refracting screen associated therewith having an outer zone adapted to transmit light therethrough, and having a central portion provided with variable downwardly and variable laterally-refracting elements.

In testimony whereof I hereunto affix my signature in the presence of two witnesses.

EMERSON L. CLARK.

Witnesses:
 IRENE MAJERUS,
 MAE M. CLARK.